United States Patent
Lorey et al.

(10) Patent No.: US 10,220,738 B2
(45) Date of Patent: Mar. 5, 2019

(54) SUSPENSION DEVICE

(71) Applicant: GRAMMER AG, Amberg (DE)

(72) Inventors: Konstantin Lorey, Schmidgaden (DE); Johann Deml, Thanstein (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/372,158

(22) Filed: Dec. 7, 2016

(65) Prior Publication Data
US 2017/0166100 A1 Jun. 15, 2017

(30) Foreign Application Priority Data
Dec. 10, 2015 (DE) .................... 10 2015 121 526

(51) Int. Cl.
*B60N 2/50* (2006.01)
*B60N 2/54* (2006.01)

(52) U.S. Cl.
CPC ............ *B60N 2/505* (2013.01); *B60N 2/502* (2013.01); *B60N 2/507* (2013.01); *B60N 2/544* (2013.01)

(58) Field of Classification Search
CPC ........ B60N 2/505; B60N 2/502; B60N 2/544; B60N 2/50; B60N 2/54; B60N 2/507; B60N 2/509; B60N 2/522; B60N 2/548; B60N 2/02; B60N 2/032; B60N 2/506
USPC .................... 248/503.1, 585, 565, 595, 560; 267/64.12; 297/344.15
See application file for complete search history.

(56) References Cited

U.S. PATENT DOCUMENTS

| 2,840,140 | A | * | 6/1958 | Harrington | ........... B60N 2/502 248/430 |
|---|---|---|---|---|---|
| 2,954,071 | A | * | 9/1960 | Morrison | ............... B60N 2/502 248/420 |
| 3,085,778 | A | * | 4/1963 | Korn | ..................... B60N 2/502 248/565 |
| 3,215,386 | A | * | 11/1965 | Swenson | ................ B60N 2/045 248/566 |
| 3,298,654 | A | * | 1/1967 | Dome | .................... B60N 2/502 248/421 |

(Continued)

FOREIGN PATENT DOCUMENTS

| DE | 18 96 880 U | 7/1964 |
|---|---|---|
| DE | 71 13 072 U | 7/1971 |

(Continued)

OTHER PUBLICATIONS

Search Report prepared by the German Patent Office dated Oct. 25, 2016, for German Patent Application No. 10 2015 121 526.8.

(Continued)

*Primary Examiner* — Nkeisha Smith
(74) *Attorney, Agent, or Firm* — Sheridan Ross P.C.

(57) ABSTRACT

The invention relates to a suspension device, in particular for a vehicle seat, comprising an upper suspension part and a lower suspension part, which can be connected to one another by a first swivelling connector and a second swivelling connector, wherein a first spring unit can be connected in a first end region on the one hand by means of an adjusting device to the first swivelling connector and can be connected in a second end region on the other hand to the lower suspension part, wherein by means of the adjusting device the position of the first spring unit can be adjusted in order to adjust the spring force and the spring rate of the suspension device.

7 Claims, 10 Drawing Sheets

(56) References Cited

U.S. PATENT DOCUMENTS

| | | | | | |
|---|---|---|---|---|---|
| 3,700,203 | A | * | 10/1972 | Adams | B60N 2/045 248/419 |
| 3,756,552 | A | * | 9/1973 | Wilhelms | B60N 2/502 248/565 |
| 3,917,209 | A | * | 11/1975 | Adams | B60N 2/502 248/567 |
| 4,520,986 | A | * | 6/1985 | Liljequist | B60N 2/502 248/419 |
| 4,702,454 | A | * | 10/1987 | Izumida | B60N 2/502 248/576 |
| 4,714,227 | A | * | 12/1987 | Holm | B60N 2/502 248/550 |
| 5,957,426 | A | * | 9/1999 | Brodersen | B60N 2/502 248/421 |
| 6,340,152 | B1 | * | 1/2002 | Ritchie | B60N 2/501 188/300 |
| 6,773,049 | B2 | * | 8/2004 | Rupiper | B60N 2/06 296/63 |
| 6,935,693 | B2 | * | 8/2005 | Janscha | B60N 2/502 248/550 |
| 7,032,874 | B2 | * | 4/2006 | Meyers | B60N 2/505 248/421 |
| 7,571,886 | B2 | * | 8/2009 | Carter | B60N 2/502 248/419 |
| 8,414,054 | B2 | * | 4/2013 | Komatsubara | B60N 2/1814 296/65.02 |
| 2003/0201660 | A1 | * | 10/2003 | Janscha | B60N 2/502 297/216.17 |

FOREIGN PATENT DOCUMENTS

| | | |
|---|---|---|
| DE | 21 62 632 A1 | 6/1973 |
| GB | 674 251 A | 6/1952 |
| JP | S58-12840 A | 1/1983 |
| WO | WO 91/04 881 A1 | 4/1991 |

OTHER PUBLICATIONS

Extended Search Report for European Patent Application No. 16199638.4, dated May 2, 2017, 3 pages.

* cited by examiner

SUSPENSION DEVICE

CROSS-REFERENCE TO RELATED APPLICATIONS

This application claims the benefit of German Patent Application No. 10 2015 121 526.8 filed Dec. 10, 2015, the entire contents of each of which are incorporated herein by reference.

FIELD

The invention relates to a suspension device, in particular for a vehicle seat, comprising an upper suspension part and a lower suspension part, which can be connected to one another by a first swivelling connector and a second swivelling connector.

BACKGROUND

Suspension devices of this kind for vehicle seats are known from the prior art, wherein the upper suspension part, the lower suspension part, the first and the second swivelling connector form a parallelogram, so that the upper suspension part is parallel to the lower suspension part even in the case of a spring movement. The suspension devices preferably comprise a spring for the suspension of the vehicle seat, wherein the extension force of the suspension device can be adjusted by tensioning the spring.

However, when a relatively heavy driver sits down on the vehicle seat and wants to adjust the extension force according to his weight, he has to significantly increase the pretensioning of the spring which requires a considerable amount of force and also the adjustment cannot be performed rapidly.

SUMMARY

The object of the present invention is therefore to provide a suspension device, by means of which the extension force can be adjusted rapidly and with little force.

Said object is achieved according to the features of claim 1. Advantageous embodiments of the invention are described in the dependent claims.

The core idea of the invention is to provide a suspension device, in particular for vehicle seats, comprising an upper suspension part and a lower suspension part, which can be connected to one another by a first swivelling connector and a second swivelling connector, wherein a first spring unit at a first end region can be connected on the one hand by means of an adjusting device to the first swivelling connector and at a second end region can be connected on the other hand to the lower suspension part, wherein by means of the adjusting device the position of the first spring unit can be adjusted in order to adjust the extension force of the suspension device.

The term "spring unit" is defined as a unit which comprises at least one spring in the conventional sense. A spring unit or a spring can be designed to be mechanical or hydraulic or pneumatic. Advantageously, the spring can also be the spring unit itself. Said spring is preferably a tension spring which can be configured in many different ways. By having a mechanical design the weight of the suspension device can be reduced further and a simpler structure can be provided.

According to a preferred embodiment, the suspension device comprises more than one spring unit, i.e. in addition to the first spring unit a second, third spring unit etc., wherein each spring unit comprises at least one spring so that the structural height of the suspension device can be reduced further in this way, as force introduced to the suspension device can be absorbed by two or more springs. The springs can thus be smaller in size. It is particularly advantageous to provide two springs for the suspension device. However, also any number of springs can be provided, in particular three or more.

The first and second end region of the spring unit are here preferably the first and the second end of the spring, wherein preferably the first and/or the second end of the spring comprise an eyelet, so that the spring or the spring unit can be hung or suspended easily into openings or devices provided for this purpose.

According to the invention, the spring rate and the extension force of the suspension device according to claim 1 are changed by adjusting the position of the first spring unit and not by changing the spring tension of the spring unit, i.e. in particular of the spring.

An adjustment of the position is hereby synonymous with a change in the spatial position of the spring unit. By changing the position of the spring unit or the spring of the spring unit a lever engaging with the spring unit can be adjusted in length.

According to a preferred embodiment, it is particularly advantageous if the first end region of the first spring unit can be adjusted in position by means of the adjusting device, wherein the position of the second end region is essentially constant.

This means that by means of the adjusting device in particular the position or location of the first end region of the first spring unit can be adjusted. In particular, in this way the first end region is adjusted relative to the lower suspension part, which is preferably rigidly connectable to a base, a chassis or the like. The lever engaging with the first spring unit thus extends from a first pivot axis of the first swivelling connector with the lower suspension part to the first end region of the spring unit. By adjusting or displacing the first end region of the spring unit the length of the lever can be adjusted so that in this way the spring rate and the extension force of the suspension device can be adjusted. The first end region thus includes accordingly the force transmission point of the spring unit.

The extension force is adjusted on the basis of the following relation. As already known, a torque is proportional to the length of a lever when the applied force is constant. By adjusting the position of the first end region the length of the lever is changed. If a relatively heavy driver is sitting on the vehicle seat, which has a suspension device according to the invention, the lever has to be correspondingly longer than for a light driver.

Since according to the invention the spring tension is not changed to adjust the extension force but only the position of the spring unit is changed, only a small force needs to be applied by the user to adjust the extension force of the suspension device. In this way also a very rapid adjustment of the extension force is possible.

According to a preferred embodiment, the suspension device can comprise at least one damper. Preferably, a first end region of the damper is connected to the adjusting device and a second end region of the damper is connected to the lower suspension part. In this way the damping performance of the damper and thereby the damping performance of the suspension is adjusted automatically according to the driver's weight when performing an adjustment. If the lever is lengthened the lift of the damper and the active lever are also increased accordingly for the application of a damping force. Accordingly if the lever is shortened the lift of the damper is reduced.

The kinematics of the suspension device can be improved further according to a particularly preferred embodiment, if the length of the first swivelling connector is not the same as the length of the second swivelling connector. Preferably, the length of the second swivelling connector is greater than the length of the first swivelling connector.

In this way the upper suspension part is no longer arranged parallel to the lower suspension part; this means that the upper suspension part, the lower suspension part and the first and second swivelling connector no longer form a parallelogram as known from the prior art. This arrangement is defined synonymously as a "false parallelogram".

According to this embodiment, the height of the suspension device increases in this way, but only by a small amount. Previous suspension devices with a parallelogram arrangement have for example a height of about 58 mm, whereas the suspension device with the false parallelogram has a height of about 62 mm.

By converting the shape of the parallelogram to a false parallelogram there can only be a slight height adjustment, but significantly improved kinematics of the suspension device, as explained in more detail in the following.

In this case the first swivelling connector can be connected by means of the first pivot axis to the lower suspension part and by means of a third pivot axis to the upper suspension part. The second swivelling connector can be connected by means of a second pivot axis to the lower suspension part and by means of a fourth pivot axis to the upper suspension part.

As already noted, the upper suspension part is no longer parallel to the lower suspension part, the upper suspension part and the lower suspension part form an angle relative to one another, wherein the angle is dependent on the height of the upper suspension part.

The direction of force extends in both cases between the third and fourth pivot axis, as the force is introduced via said third and fourth pivot axis to the swivelling connectors and the lower suspension part. As the second swivelling connector is designed to be longer than the first swivelling connector, the position of the direction of force of the false parallelogram changes relative to the true parallelogram. In this way the force lever is also increased which is perpendicular to the direction of force and runs through the second pivot axis of the false parallelogram relative to the true parallelogram. In this way the joint forces, in particular those of the lower suspension part, and the friction are reduced and the extension force of the suspension is increased. In particular, the spring rate and the spring characteristic curve are dependent on a weight position of the driver relative to the upper suspension part.

Due to the fact that the spring rate and the spring characteristic curve are dependent on the weight position of the driver, it is possible according to a preferred embodiment to enable the adjustment of the spring rate by means of a displacement of the driver weight in the longitudinal direction of the vehicle seat. In this way it is possible to make use of the fact that a lighter driver is generally smaller than a heavier driver, such that the light driver sits further to the front than a heavy driver in the longitudinal direction of the vehicle seat.

Overall, it is thus possible to configure the spring characteristic curve to be very progressive, whereby it is possible to omit end-stop buffers for the suspension device.

According to a preferred embodiment, the adjusting device is designed as follows.

The adjusting device has a stationary rotary lever relative to the first swivelling connector, which lever is mounted rotatably about a first axis of rotation, which is also stationary relative to the first swivelling connector. Furthermore, the adjusting device comprises an adjusting element which is connected to the first axis of rotation and can be displaced during an adjustment along a displacement axis. The displacement axis can particularly preferably be the first axis of rotation.

Furthermore, a first lever element is arranged pivotably on said adjusting element by means of a second axis of rotation, wherein on said first lever element a second lever element is arranged pivotably by means of a third axis of rotation and the second lever element is connected pivotably by means of a fourth axis of rotation to the first swivelling connector.

The spring unit and in particular the springs are connected at least operatively to the second lever element of the adjusting device.

By means of such an arrangement the spring unit can thus be adjusted in location or position.

Of course, additional adjusting devices are possible which are not explained in more detail here.

Further advantageous embodiments are described in the subclaims.

BRIEF DESCRIPTION OF THE DRAWINGS

Further aims, advantages and benefits of the present invention can be taken from the following description in connection with the drawings, in which.

DETAILED DESCRIPTION

Figure 1A:
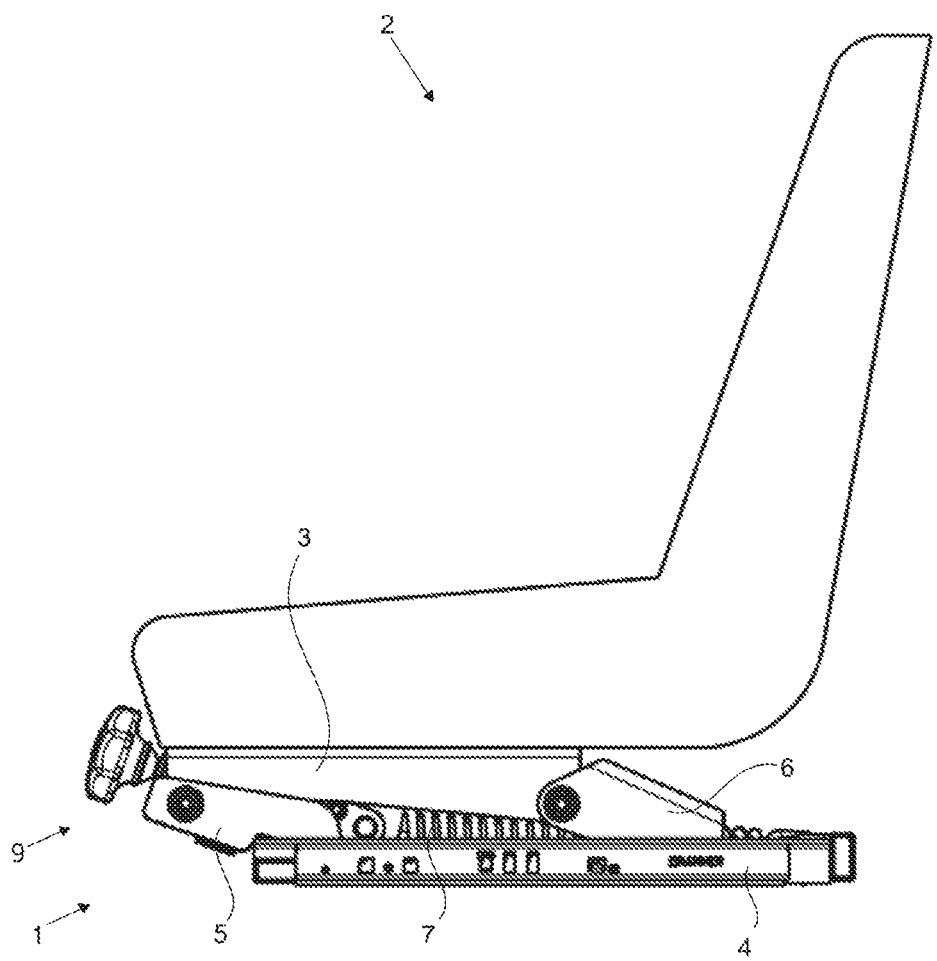
FIG. 1A shows the suspension device with a true parallelogram and a vehicle seat.
Figure 1B:
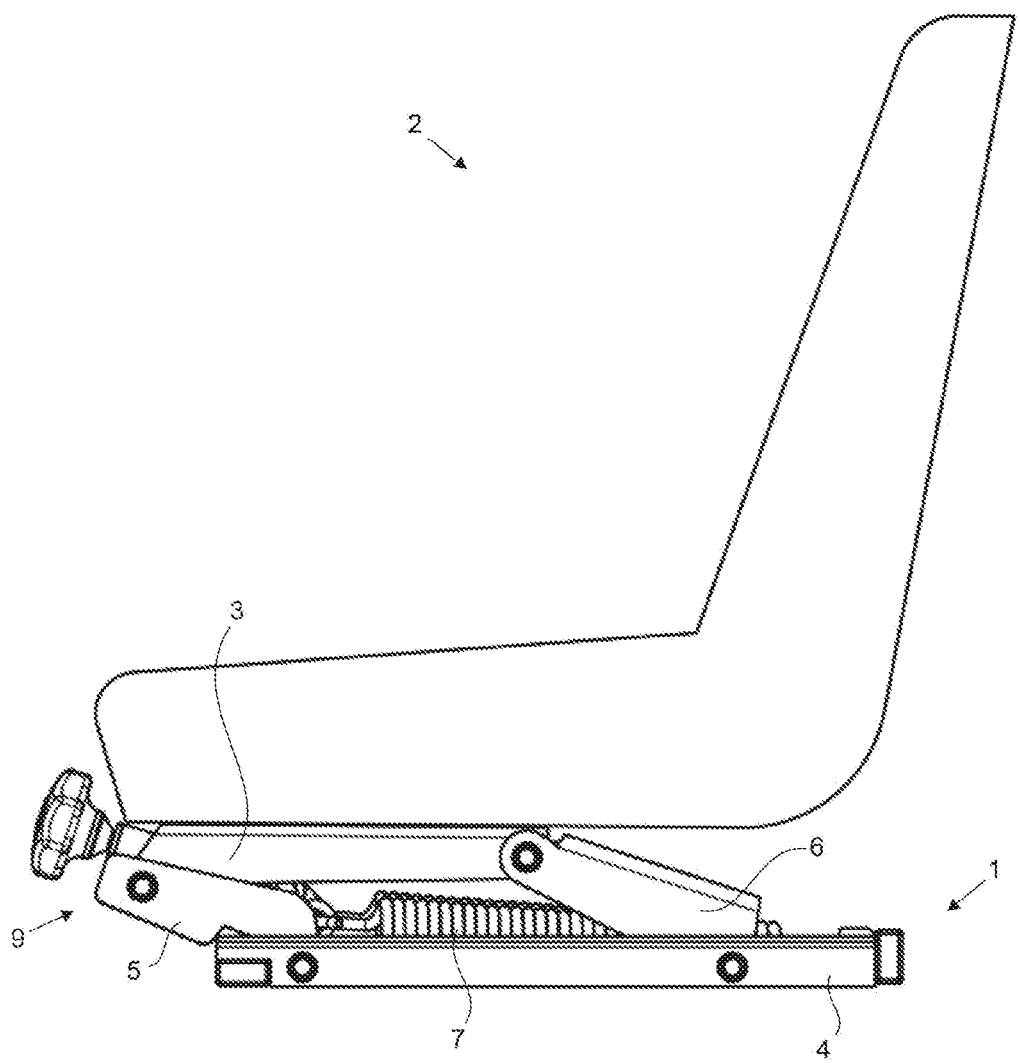
FIG. 1B shows the suspension device with a false parallelogram and a vehicle seat.

The suspension devices 1 shown in FIGS. 1A and 1B comprise an upper suspension part 3, a lower suspension part 4, a first swivelling connector 5 and a second swivelling connector 6. The upper suspension part 3 is connected in a front region 3' by means of a third pivot axis 13 to the first swivelling connector 5 and in a rear region 3" by means of a fourth pivot axis 14 to the second swivelling connector 6. The lower suspension part 4 is thereby connected in a front region 4' by means of a first pivot axis 11 to the first swivelling connector 5 and is connected in a rear region 4" by means of a second pivot axis 12 to the second swivelling connector 6.

In this case FIG. 1A shows the suspension device 1 with a true parallelogram and FIG. 1B shows the suspension device 1 with a false parallelogram.

Figure 2A:
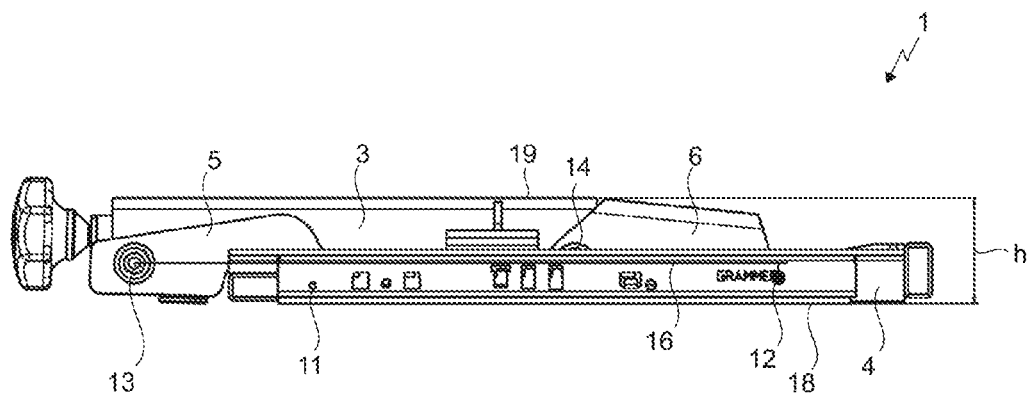
FIG. 2A shows the suspension device according to FIG. 1A.
Figure 2B:
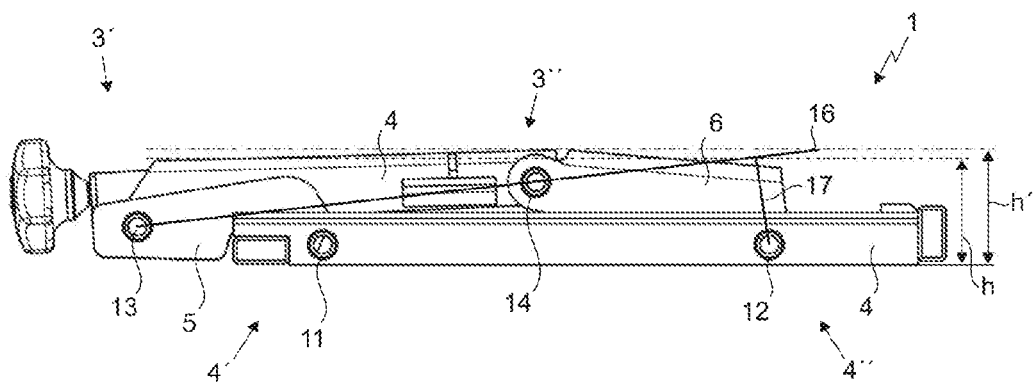
FIG. 2B shows the suspension device according to FIG. 1B.

The difference between the true and the false parallelogram is illustrated more clearly in FIGS. 2A and 2B, wherein FIG. 2A shows the suspension device 1 with the true parallelogram and FIG. 2B shows the suspension device 1 with the false parallelogram, wherein in FIG. 2B the second swivelling connector 6 is designed to be longer than the first swivelling connector 5, wherein in particular the length between the second 12 and fourth pivot axis 14 is longer than the length between the first 11 and third pivot axis 13. In particular the corner points of both the true and false parallelograms are formed by the first, second, third and fourth pivot axis.

As can clearly be seen from a comparison of FIGS. 2A and 2B the upper suspension part 3 at least in the shown lower position is no longer parallel to the lower suspension part 4. Furthermore, it can be seen that the overall height h of the suspension device 1 is only slightly increased to the height h'. The heights h and h' are measured as the distance between a lower side 18 of the lower suspension part 4 and an upper side 19 of the upper suspension part 3.

According to FIG. 2B however, as described above, the upper side 19 of the upper suspension part 3 in the lower position is no longer parallel to the lower side 18 of the lower suspension part 4, so that the height is measured between the lower side 18 and the highest point of the upper side 19, as viewed in the vertical direction H of the vehicle seat.

However, this slight change in the true parallelogram towards the false parallelogram has a significant effect on the suspension device 1.

By lengthening the second swivelling connector 6, in particular by lengthening the distance between the second 12 and fourth pivot axis 14, the upper suspension part 3 is adjusted in its position or location so that the upper suspension part 3, in particular the upper side 19 of the upper suspension part 3, is no longer parallel to the lower suspension part 4, in particular the lower side 18 of the lower suspension part 4. In this way the direction of force 16 is also changed in position, as the direction of force 16 is defined by the third 13 and the fourth pivot axis 14. As shown from a comparison of FIGS. 2A and 2B, due to the change in position of the direction of force 16, the force lever 17 also changes, which is arranged to be perpendicular to the direction of force 16 and is running through the second pivot axis 12. As said force lever 17 is lengthened by the slight lengthening of the second swivelling connector 6, the joint forces, in particular in the region of the lower suspension part 4, and the frictional forces are reduced. Furthermore, as the upper suspension part 3 is no longer parallel to the lower suspension part 4, a spring characteristic curve of the suspension device 1 and also a spring rate and an extension force are dependent on the actual weight position relative to the upper suspension part.

It is therefore possible to configure the spring characteristic curve of the suspension device 1 to be very progressive. A heavy vehicle driver is generally also taller in body height so that a heavy vehicle driver will sit further back on the vehicle seat 2. The spring rate of the suspension device 1 is then greater with a heavier driver than the spring rate with a lighter and smaller driver. In this way also it is possible to perform an automatic adjustment of the spring rate of the suspension device 1 to the weight of the driver.

In the following the operation of the adjusting device 9 is described in more detail.

Figure 3A:
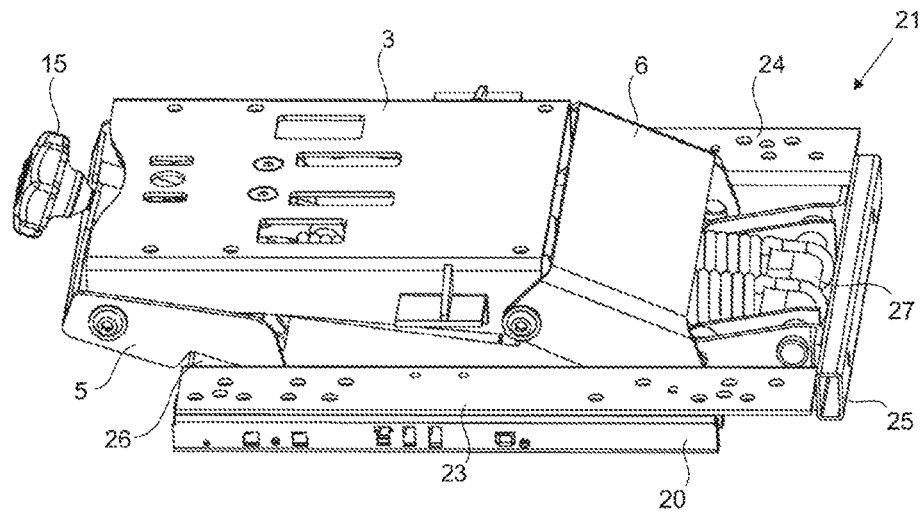
FIG. 3A is a perspective view of the suspension device according to one embodiment.

FIG. 3A is a perspective view of the structure of the suspension device 1. The lower suspension part 4 comprises a linear displacement means 20 so that the suspension device 1 can be displaced linearly in longitudinal direction L.

The structure of the suspension device 1 with a true parallelogram corresponds to the structure of a false parallelogram, the difference only being the second swivelling connector 6. The other structural components are designed to be essentially identical. The rotary lever 15 of the adjusting device can also be seen as well as a suspending device, by means of which springs of the suspension device 1 and dampers (not shown here) can be connected to the lower suspension part.

The lower suspension part 4 comprises two longitudinal elements 23, 24, which each extend in longitudinal direction L and two transverse elements 25, 26, which extend in width direction B.

The suspending device 21, which is arranged here in the rear region 4" of the lower suspension part 4, comprises a first suspending element 27, which extends in width direction B and is designed to be tubular, wherein other configurations are also possible, for example square or hexagonal shapes. However, a tubular configuration is preferred, as eyelets of springs (not shown here) can be held particularly effectively. Furthermore, the suspending device 21 comprises at least one first damper suspension element 28, by means of which one end of a damper 22 can be connected to the lower suspension part 4.

Figure 3B:
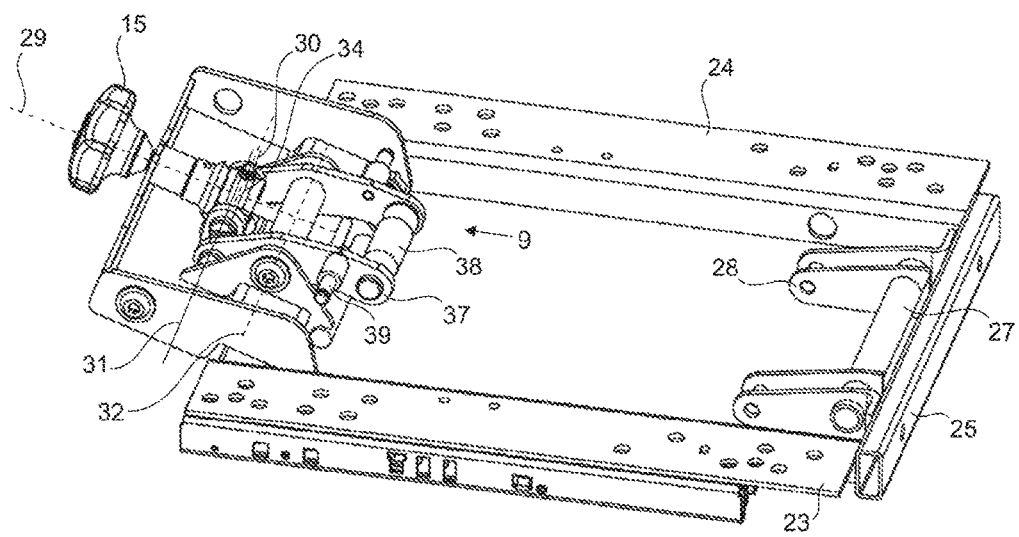
FIG. 3B is a perspective view of the suspension device with an adjusting device according to one embodiment.

FIG. 3B shows a first embodiment of the adjusting device 9. As shown the adjusting device 9 comprises a rotary lever 15 which is rotatable about a first axis of rotation 29, wherein preferably both the rotary lever and the first axis of rotation are arranged to be stationary relative to the first swivelling connector 5. In this case 'stationary' means that the position of the component is constant, but rotations are permitted. The rotary movement of the axis 29 is transmitted by means of two cone gear wheels (not shown here) to the axis 30. Of course other configurations for transmitting the rotary movement are possible.

Furthermore, the adjusting device 9 comprises an adjusting element 33, which can be connected to the first axis of rotation and can be displaced with an adjustment along a displacement axis 35. According to the embodiment shown, the displacement axis 35 corresponds to the axis of a threaded rod 34 and is arranged to be perpendicular to the first axis of rotation 29.

Furthermore, a first lever element 36 can be arranged pivotably on the adjusting element by means of a second axis of rotation 30, wherein on said first lever element 36 a second lever element is arranged pivotably by means of third axis of rotation 31 and the second lever element 37 can be connected pivotably by means of a fourth axis of rotation 32 to the first swivelling connector 5.

Here a second suspending element 38 is arranged on the second lever element 37 for suspending an eyelet of a spring. Preferably, also a second damper suspending element 39 is secured to the second lever element 37.

Figure 3C:
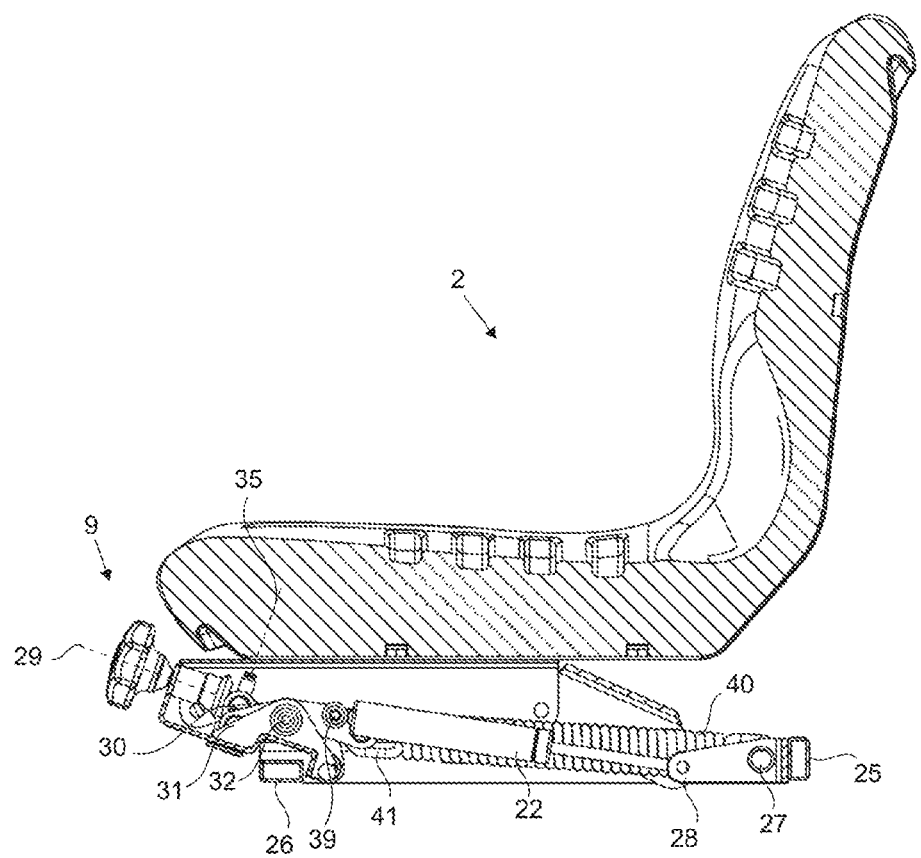
FIG. 3C is a side view of the suspension device according to FIGS. 3A and 3B.

FIG. 3C shows the embodiment of a suspension device 1 shown in FIG. 3A and 3B in a side view with a damper 22 and a spring 40.

Figure 3D:
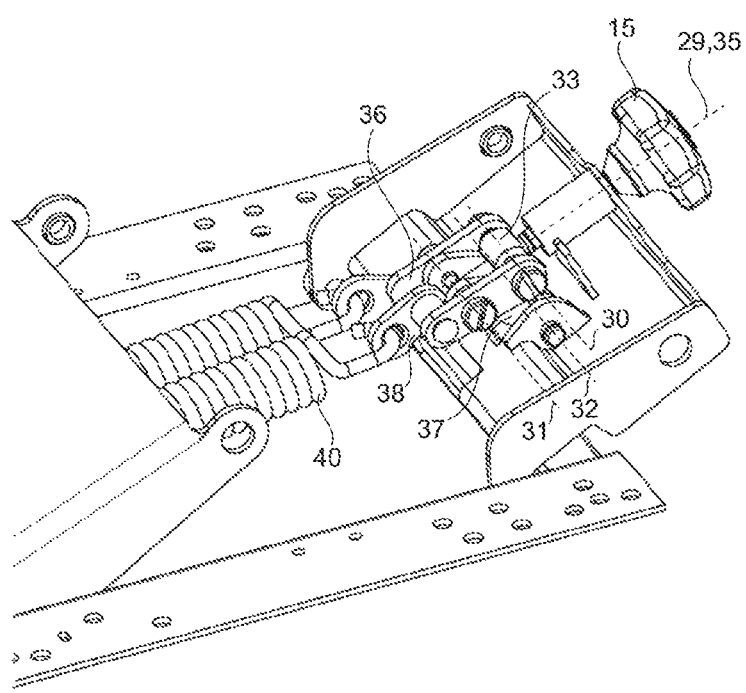
FIG. 3D shows an adjusting device according to a further preferred embodiment.

In FIG. 3D a further embodiment of the adjusting device 9 is shown. However, in this case the displacement axis 35 is not perpendicular to the first axis of rotation 29, but corresponds to the first axis of rotation 29. Furthermore, the rotary movement of the axis of rotation 29 is not transmitted by gear transmission to the axis of rotation 30 but is transmitted by means of a gate-type gear.

It is also possible that, independently of the design of the adjusting device 9, with at least two springs 40, as shown in FIG. 3D, only one spring 40 is connected to the second suspending element 38 and the other spring 40 is connected directly to the first swivelling connector 5. In this way the suspension device 1 has a certain minimum spring output, defined by the spring 40, which is not connected to the adjusting device 9.

Figure 4A:
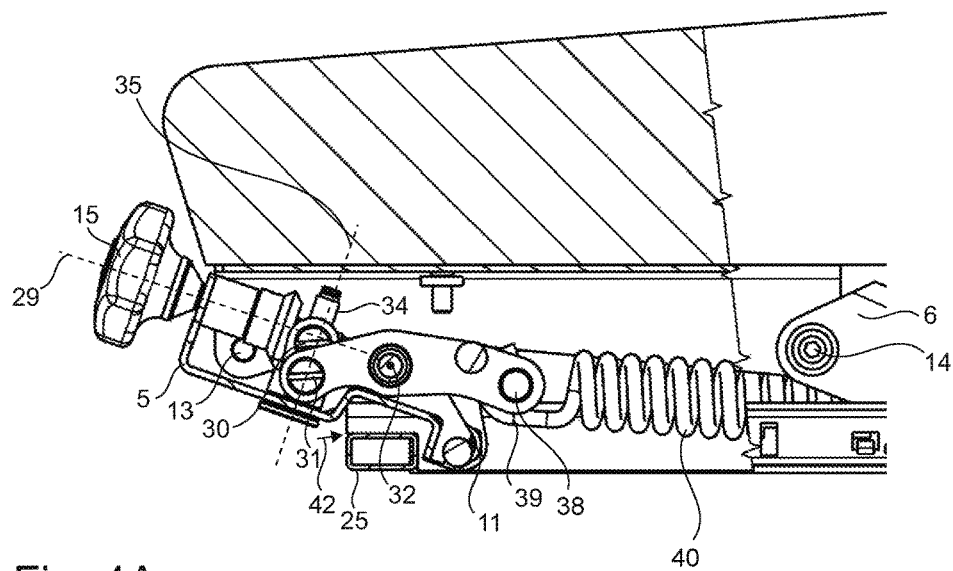
FIG. 4A is a side view of the suspension device with an adjusting device according to FIG. 3A.
Figure 4B:
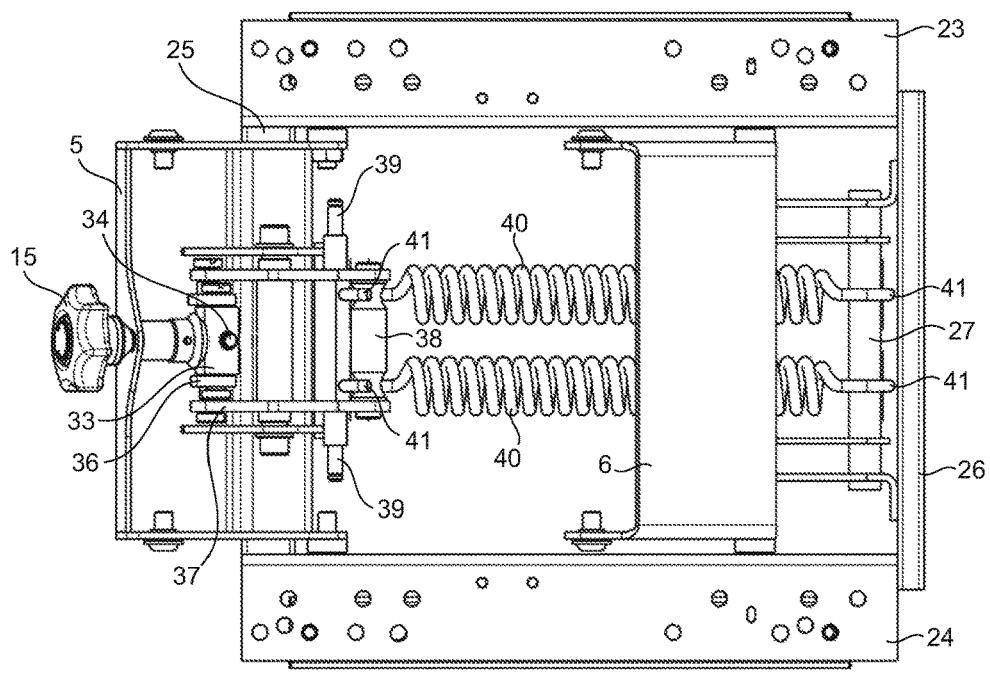
FIG. 4B is a plan view of the suspension device according to FIG. 4A.
Figure 5A:
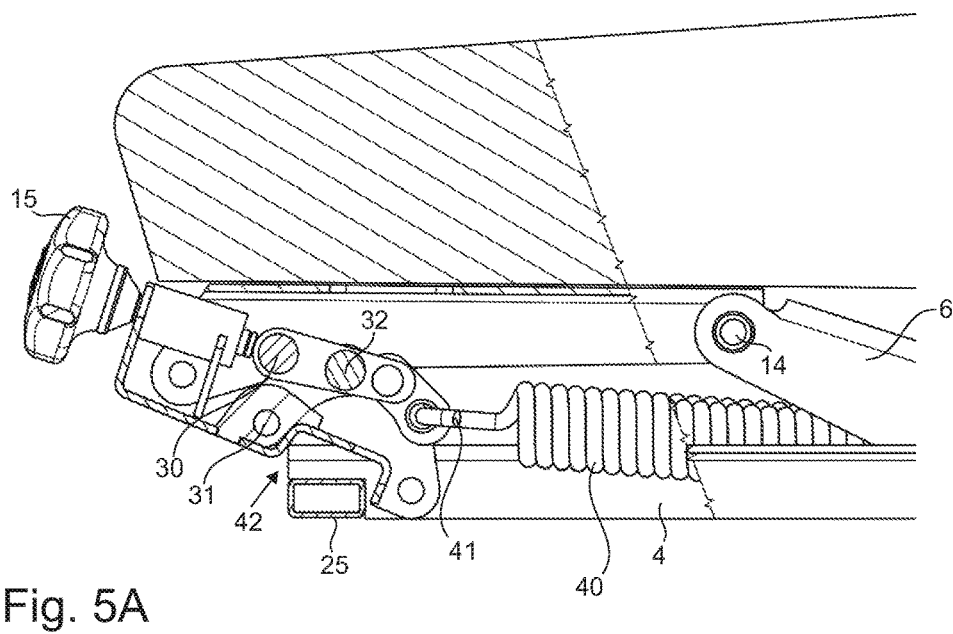
FIG. 5A is a side view of the suspension device with an adjusting device according to FIG. 3D.
Figure 5B:
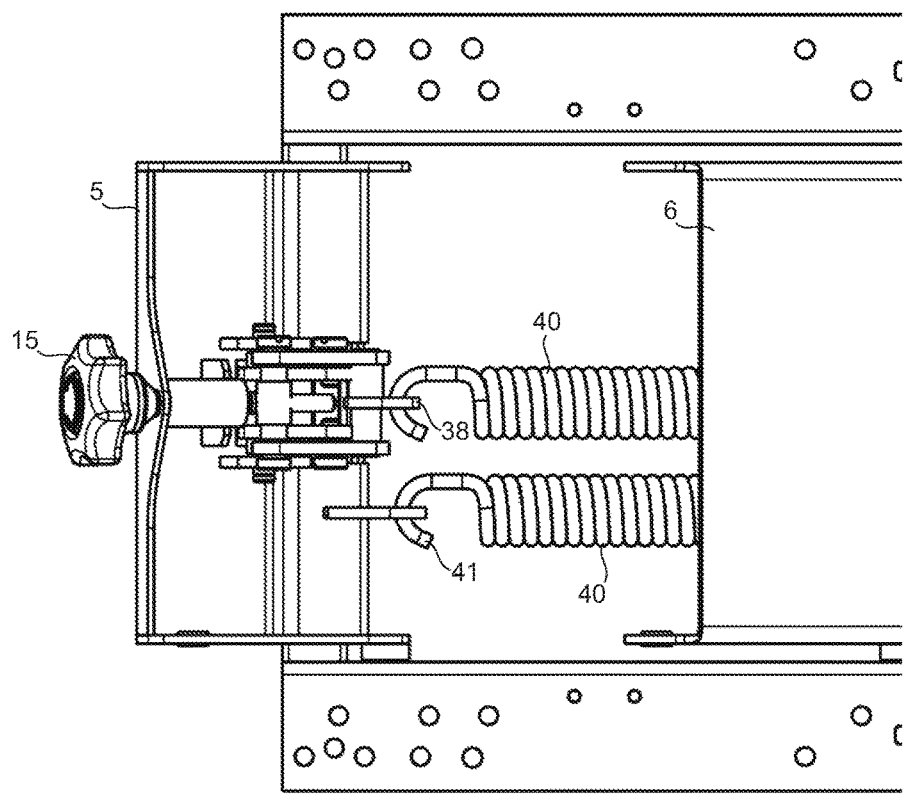
FIG. 5B is a plan view of the suspension device according to FIG. 5A.

FIGS. 4A and 4B show once again the embodiment according to FIG. 3B and FIGS. 5A and 5B show the embodiment according to FIG. 3D, in both side view and in plan view.

As shown in particular in FIG. 4A and 5A, the first swivelling connector 5 comprises a recess 42, which corresponds essentially to the transverse element 25, so that the first swivelling connector can be pivoted downwards as far as possible in vertical direction H. Furthermore, by means of said recess 42 the suspension device 1 can be made to have smaller dimensions overall, otherwise the first swivelling connector 5 cannot be lowered so far. However, this is possible by means of the recess 42, as shown in FIG. 4A and 5A. The embodiment of the adjusting device 9 of FIGS. 3D, 5A and 5B compared to the embodiment of the adjusting device 9 according to FIGS. 3B, 4A and 4B has reduced friction of the components so that the adjusting device 9 can be activated with less force.

Figure 6A:
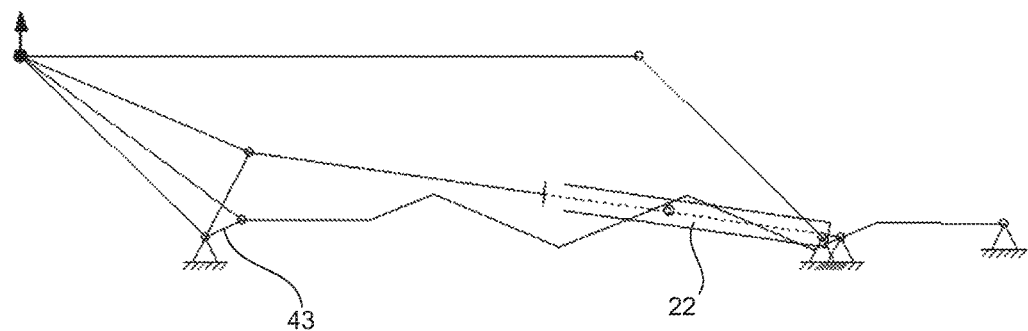
FIGS. 6A, 6B shows the suspension device with a spring in different adjusting positions.
Figure 6B:
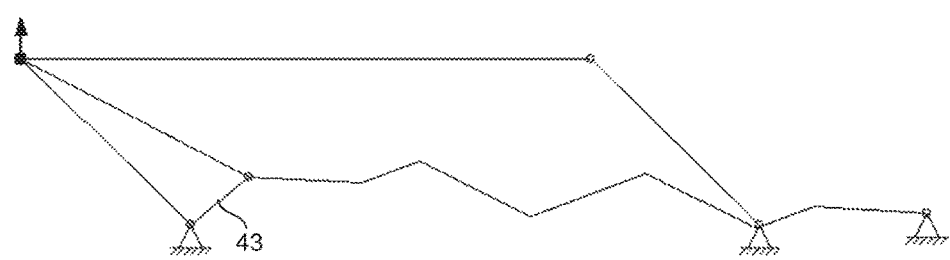

In FIGS. 6A and 6B the kinematics of the suspension device 1 is shown schematically, wherein the suspension device 1 is formed by a true parallelogram. FIG. 6A shows the situation for a light driver, FIG. 6B the situation for a heavy driver.

As shown clearly from a comparison of FIGS. 6A and 6B, by activating the adjusting device 9 a lever length 43 is changed. For a light driver said lever 43 is shorter than for a heavy driver, so that with a heavy driver force or energy can be absorbed by the spring 40. The resulting lever length 43 is therefore shorter.

Figure 7A:
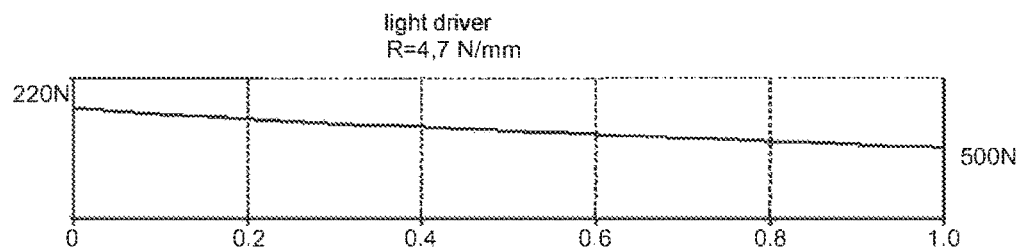
FIGS. 7A, 7B shows the characteristic curve of the suspension device for a light and a heavy driver.
Figure 7B:
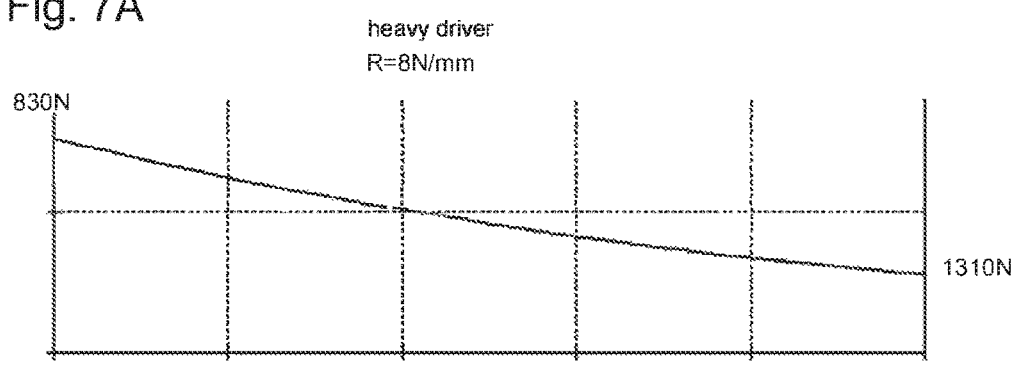

The characteristic curve of the suspension for a light driver is shown in FIG. 7A and for a heavy driver in FIG. 7B. The values are given by way of example, but other values may also be used.

The following drawings relate to an embodiment with a false parallelogram and two springs 40, wherein a first spring 40 is connected to the adjusting device 9 and can be adjusted in position accordingly, wherein the second spring 40 is connected directly to the first swivelling connector 5 and cannot be adjusted. The characteristic curves shown relate to the whole suspension, i.e. to both springs 40.

Figure 8A:
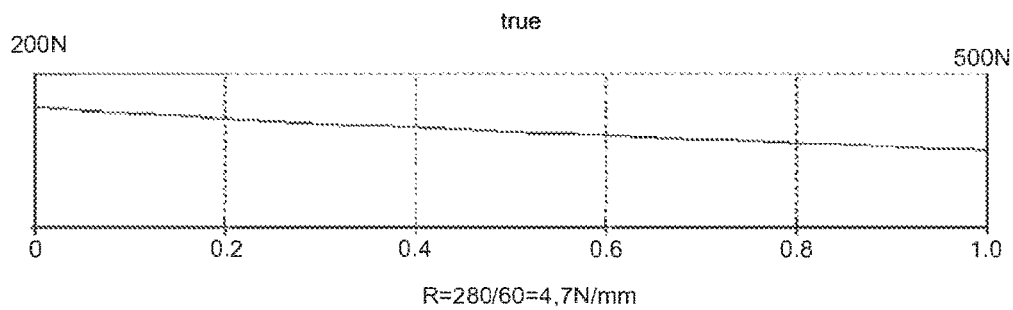
FIGS. 8A, 8B shows the characteristic curve for the suspension device according to one embodiment with a false parallelogram for a light and heavy driver who is sitting in the front.
Figure 8A:
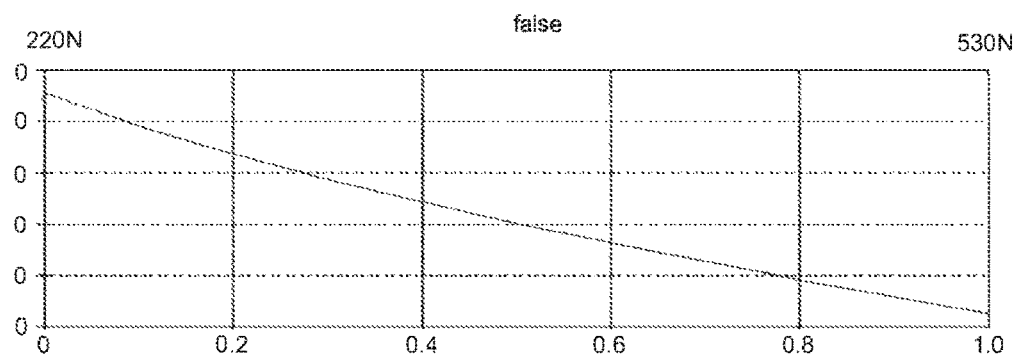
Figure 8B:
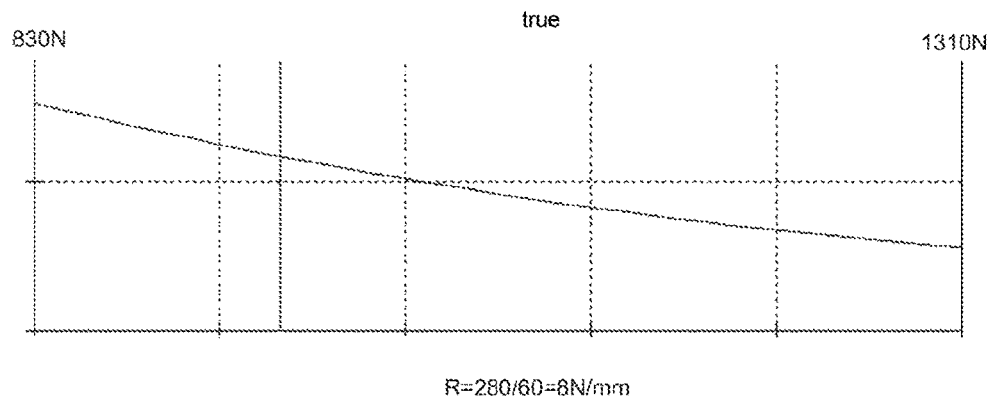
Figure 8B:
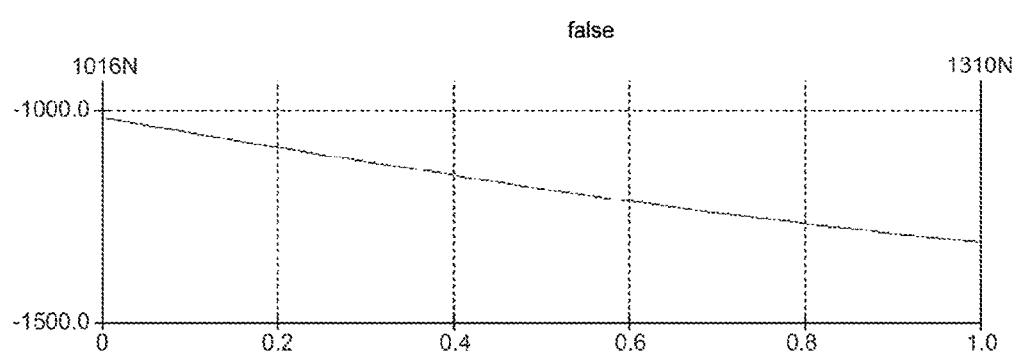

The characteristic curves shown in FIGS. 8A and 8B show a comparison between the suspension device 1 with a true parallelogram and a false parallelogram for both a light driver and a heavy driver, who has an effect on the suspension device 1 as viewed in the longitudinal direction at the front of the suspension device 1. The characteristic curve for the true parallelogram is on the left, the characteristic curve for the false parallelogram is on the right.

As can be seen from a comparison, the spring rate of the true parallelogram is significantly different from the false parallelogram and relates more to the driving comfort of the respective user.

Figure 8C:
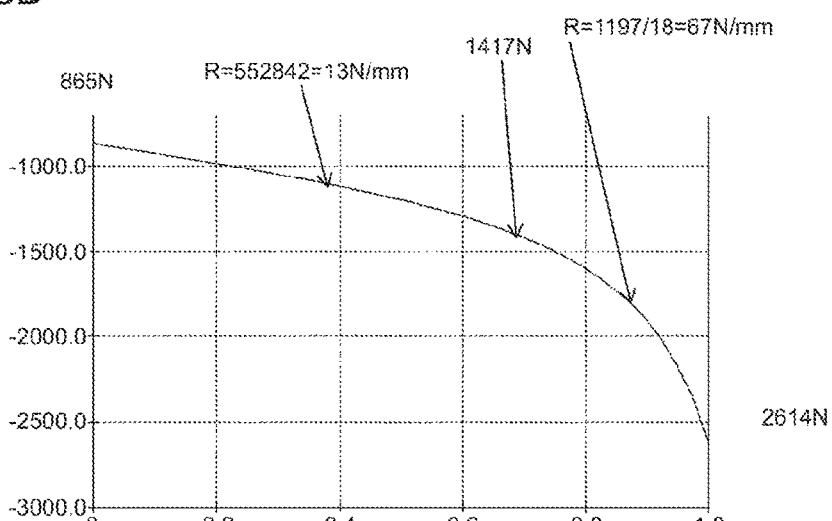
FIG. 8C shows the characteristic curve for the suspension device according to FIGS. 8A, 8B for a heavy driver who is sitting in the back.

However, as a heavy driver is generally taller than a light driver, the heavy driver has more of an effect on the rear of the suspension device 1. This is illustrated in FIG. 8C. As can be seen, the characteristic curve of the suspension can be configured to be very progressive. In this case the characteristic curve is more or less linear up to 1417 N, and after this it changes significantly. In addition, due to this very progressive configuration, the weight of the suspension device 1 can be reduced, as it is possible to avoid having end-stop buffers.

All of the features disclosed in the application are claimed as being essential to the invention, insofar as they are novel over the prior art either individually or in combination.

LIST OF REFERENCE NUMERALS

1 suspension device
2 vehicle seat
3 upper suspension part
3' front region of the upper suspension part
3" rear region of the upper suspension part
4 lower suspension part
4' front region of the lower suspension part
4" rear region of the lower suspension part
5 first swivelling connector
6 second swivelling connector
7 first spring unit
8 first end region of the first spring unit
9 adjusting device
10 second end region of the first spring unit
11 first pivot axis
12 second pivot axis
13 third pivot axis
14 fourth pivot axis
15 rotary lever
16 force direction
17 force lever
18 lower side lower suspension part
19 upper side upper suspension part
20 linear displacement means
21 suspending device
22 damper
23 longitudinal element
24 longitudinal element
25 transverse element
26 transverse element
27 first suspending element
28 first damper suspending element
29 first axis of rotation
30 second axis of rotation
31 third axis of rotation
32 fourth axis of rotation
33 adjusting element
34 threaded rod
35 displacement axis 36 first lever element
37 second lever element
38 second suspending element
39 second damper suspending element
40 spring
41 eyelet
42 recess
43 lever length
B width direction
L longitudinal direction
H vertical direction

What is claimed is:

1. A suspension device, for a vehicle seat, comprising:
an upper suspension part and a lower suspension part, wherein the upper suspension part and the lower suspension part can be connected to one another by a first swivelling connector and a second swivelling connector, wherein a first spring unit can be connected in a first end region by an adjusting device to the first swivelling connector and can be connected in a second end region to the lower suspension part, wherein by means of the adjusting device, a position of the first spring unit can be adjusted, in order to adjust a spring force and a spring rate of the suspension device, wherein the adjusting device comprises an adjusting element, wherein a first lever element is arranged pivotably on the adjusting element by means of a second axis of rotation, wherein a second lever element is arranged pivotably on the first lever element by means of a third axis of rotation and the second lever element is connected pivotably to the first swivelling connector by means of a fourth axis of rotation, wherein the adjusting device comprises a rotary lever which is stationary relative to the first swiveling connector, which rotary lever is rotatably mounted about a first axis of rotation, which is stationary relative to the first swiveling connector, and wherein the adjusting element can be displaced along a displacement axis.

2. The suspension device according to claim 1, wherein a position of the first end region of the first spring unit can be adjusted by means of the adjusting device, and wherein a position of the second end region is constant.

3. The suspension device according to claim 1, wherein the suspension device comprises at least one damper, wherein a first end region of the damper can be connected to the adjusting device.

4. The suspension device according to claim 1, wherein the second swivelling connector is designed to be longer than the first swivelling connector.

5. The suspension device according to claim 1, wherein the displacement axis corresponds to the first axis of rotation.

6. The suspension device according to claim 1, wherein the first spring unit is formed by a spring, wherein preferably the spring is a tension spring.

7. The suspension device according to claim 1, wherein the first spring unit is at least connected operatively to the second lever element.

* * * * *